United States Patent
Cao et al.

(10) Patent No.: US 8,118,149 B2
(45) Date of Patent: Feb. 21, 2012

(54) SELECTIVE FREEWHEELING MECHANISM AND ELECTROMECHANICAL VEHICLE BRAKE HAVING A SELECTIVE FREEWHEELING MECHANISM

(75) Inventors: Chi-Thuan Cao, Korntal-Muenchingen (DE); Dirk Hofmann, Stuttgart (DE); Herbert Vollert, Vaihingen/Enz (DE); Willi Nagel, Remseck/Hochdorf (DE); Bertram Foitzik, Ilsfeld (DE); Bernd Goetzelmann, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 797 days.

(21) Appl. No.: 12/096,509

(22) PCT Filed: Dec. 22, 2006

(86) PCT No.: PCT/EP2006/070201
§ 371 (c)(1),
(2), (4) Date: Jun. 6, 2008

(87) PCT Pub. No.: WO2007/077177
PCT Pub. Date: Jul. 12, 2007

(65) Prior Publication Data
US 2008/0261773 A1    Oct. 23, 2008

(30) Foreign Application Priority Data
Jan. 4, 2006    (DE) .................... 10 2006 000 746

(51) Int. Cl.
*F16D 67/06*    (2006.01)
*F16D 63/00*    (2006.01)
*F16D 41/067*    (2006.01)
*F16D 41/08*    (2006.01)

(52) U.S. Cl. ............... 192/219.4; 188/162; 188/265; 192/45; 192/84.6; 192/84.8

(58) Field of Classification Search ............ 192/219.4, 192/223.2, 84.8; 74/89.39
See application file for complete search history.

(56) References Cited

U.S. PATENT DOCUMENTS

| | | | |
|---|---|---|---|
| 5,265,707 A | 11/1993 | Abe et al. | |
| 5,348,126 A * | 9/1994 | Gao ........................ | 192/223.2 |
| 6,752,249 B1 * | 6/2004 | Jungbecker et al. ........ | 188/162 |
| 6,761,252 B1 * | 7/2004 | Weiler et al. .............. | 188/72.7 |
| 8,020,675 B2 * | 9/2011 | Cao et al. .................. | 188/162 |
| 2003/0019708 A1 | 1/2003 | Goto et al. | |
| 2005/0087417 A1 * | 4/2005 | Shimomura et al. ........ | 192/45 |
| 2006/0021831 A1 * | 2/2006 | Yamamoto ................. | 188/157 |
| 2008/0217121 A1 * | 9/2008 | Cao et al. .................. | 188/157 |

FOREIGN PATENT DOCUMENTS

| | | |
|---|---|---|
| DE | 198 05 211 A1 | 8/1999 |
| EP | 0 544 186 A1 | 6/1993 |
| JP | 2001-130402 | 5/2001 |

* cited by examiner

*Primary Examiner* — Rodney Bonck
(74) *Attorney, Agent, or Firm* — Ronald E. Greigg

(57) ABSTRACT

The invention relates to a selective freewheeling mechanism for developing an electromechanical vehicle brake (service brake) into a parking brake. The freewheeling mechanism according to the invention has an outer ring and a locking element cage which are configured as an electric motor with a rotor and a stator. The rotor and stator can be swiveled in relation to each other when a coil is supplied with current. Due to a symmetric design, the freewheeling mechanism is advantageously insensitive to acceleration forces.

20 Claims, 4 Drawing Sheets

SELECTIVE FREEWHEELING MECHANISM AND ELECTROMECHANICAL VEHICLE BRAKE HAVING A SELECTIVE FREEWHEELING MECHANISM

CROSS-REFERENCE TO RELATED APPLICATION

This application is a 35 USC 371 application of PCT/EP 2006/070201 filed on Dec. 22, 2006.

BACKGROUND OF THE INVENTION

1. Field of the Invention

The invention relates to a selective freewheeling mechanism. The selective freewheeling mechanism is intended in particular for an electromechanical vehicle brake, in order to expand it into a parking brake. The invention also relates to an electromechanical vehicle brake having the selective freewheeling mechanism.

2. Description of the Prior Art

Freewheeling mechanisms are known per se and are also known as directionally-shifted clutches. A freewheeling mechanism has a shaft and an outer ring, and the shaft can also be embodied as a hollow shaft or inner ring. Between the shaft and the outer ring, there are locking elements, which allow a rotation of the shaft relative to the outer ring in one direction, the so-called freewheeling direction, and lock against a rotation of the shaft relative to the outer ring in the opposite direction, the so-called locking direction.

In a selective freewheeling mechanism, the locking elements can be put in a disengagement position, in which they are out of action, or in other words do not lock against a rotation of the shaft relative to the outer ring in any direction. In the disengagement position, the shaft is rotatable in both directions relative to the outer ring. In an engagement position, a selective freewheeling mechanism has the usual function of a freewheeling mechanism; that is, the shaft is rotatable relative to the outer ring in the freewheeling direction and is locked against rotation in the opposite locking direction.

Electromechanical vehicle brakes as wheel brakes for motor vehicles are also known. An electromechanical vehicle brake has an electromechanical actuation device, with which a fiction brake lining can be pressed for braking against a brake body that is fixed against relative rotation to a vehicle wheel. The brake body is typically a brake disk or a brake drum. The actuation device typically has an electric motor and a rotation-to-translation conversion gear that converts a rotary driving motion of the electric motor into a translational motion for pressing the friction brake lining against the brake body. Worm gears, such as spindle gears or roller worm drives, are often used as rotation-to-translation conversion gears. It is also possible to convert the rotary motion into a translational motion by means of a pivotable cam, for instance. A step-down gear, for instance in the form of a planetary gear, is often placed between the electric motor and the rotation-to-translation conversion gear. Self-boosting electromechanical vehicle brakes are also known, which have a self booster that converts a frictional force, exerted by the rotating brake body against the friction brake lining that is pressed for braking against the brake body, into a contact pressure, which presses the friction brake lining against the brake body in addition to a contact pressure that is exerted by the actuation device. Wedge, ramp, and lever mechanisms are known for the self boosting.

SUMMARY AND ADVANTAGES OF THE INVENTION

The selective freewheeling mechanism of the invention has a locking element cage, which by pivoting relative to the outer ring into an engagement position puts the locking elements in the engagement position and by pivoting relative to the outer ring into a disengagement position puts the locking elements in the disengagement position. The locking element cage, which may be embodied in a manner comparable to a roller cage of a roller bearing, puts the locking elements of the freewheeling mechanism of the invention collectively into the engagement position or the disengagement position. It is defined by this function, not by its embodiment as a "cage". According to the invention, the locking element cage and the outer ring are embodied on the order of an electric motor, as a rotor and a stator, and have at least one coil. The locking element cage may also form the stator, and the outer ring may form the rotor. By provision of current to the at least one coil, the locking element cage can be pivoted relative to the outer ring into the engagement position and/or into the disengagement position, and as a result the locking elements can be put in the engagement position and/or the disengagement position; that is, by the provision of current to the at least one coil, the freewheeling mechanism of the invention is engaged or disengaged. Pivoting means a rotation of the locking element cage relative to the outer ring about a limited angle. In addition to a monostable embodiment, in which the freewheeling mechanism remains disengaged or engaged when without current, a bistable embodiment is also conceivable, in which when without current the freewheeling mechanism remains both in the engaged and in the disengaged position and for shifting from the engagement position to the disengagement position and vice versa, the at least one coil merely has to be supplied with current. Moreover, it is preferably provided that the at least one coil generates an axially symmetrical magnetic field.

The freewheeling mechanism of the invention has the advantage that it can be embodied rotationally symmetrically. Hence, forces acting on the freewheeling mechanism do not exert any torque on parts of the freewheeling mechanism that could cause shifting of the freewheeling mechanism. Such forces may be due to acceleration acting on the freewheeling mechanism that acts on a freewheeling mechanism of an electromechanical wheel brake of a motor vehicle while the vehicle is in motion, for instance. The invention avoids unintended shifting of the freewheeling mechanism, even at high accelerations acting on the freewheeling mechanism. Moreover, given a rotationally symmetrical magnetic field, a shifting torque for engaging and/or disengaging the freewheeling mechanism acts rotationally symmetrically on the locking element cage or the outer ring in every case. As a result, a uniform action on all the locking elements is possible; all the locking elements contribute approximately equally to locking the freewheeling mechanism in the locking direction. An additional advantage of the invention is that a separate actuator is not needed for pivoting the locking element cage for engaging or disengaging the freewheeling mechanism; the function of the actuation device is integrated with the locking element cage and the outer ring as a result of the embodiment of these parts on the order of an electric motor. This economizes in terms of installation space and makes a compact embodiment of the freewheeling mechanism of the invention possible.

Advantageously, an electromechanical vehicle brake has a selective freewheeling mechanism of the type described above. As a result, the vehicle brake is expanded to a parking brake. The freewheeling mechanism acts for instance on a motor shaft of an electric motor of an actuation device of the vehicle brake. When the freewheeling mechanism is disengaged, the motor shaft of the electric motor is freely rotatable in both rotary directions; the vehicle brake can be used as a service brake, in the same way as without a freewheeling mechanism. For locking the vehicle brake, the brake is actuated and the freewheeling mechanism is engaged; the freewheeling mechanism locks against a reverse rotation of the actuation device and thus against a release of the vehicle brake. An actuating and braking force exerted by the vehicle brake is maintained unchanged even if the vehicle brake is without current. Since the engaged freewheeling mechanism is rotatable in the freewheeling direction, an actuation or in other words tightening of the vehicle brake is possible even when the freewheeling mechanism is engaged. Because of mechanical tensing of the actuated vehicle brake, the engaged freewheeling mechanism is kept in the engagement position, in which it locks against a release of the vehicle brake. As a result of the mechanical tensing of the actuated vehicle brake, the freewheeling mechanism does not release on its own, even if it is embodied in monostable form. Not until the mechanical tensing of the vehicle brake is released by the provision of current in the actuation direction does the freewheeling mechanism release, so that the vehicle brake can then be released. It is furthermore possible for an air clearance of the vehicle brake to be adjusted, and thus to make a readjustment for wear by engaging the freewheeling mechanism upon release of the vehicle brake.

BRIEF DESCRIPTION OF THE DRAWINGS

The invention is described in further detail below in conjunction with exemplary embodiments shown in the drawings, in which.

DESCRIPTION OF THE PREFERRED EMBODIMENTS

Figure 1:
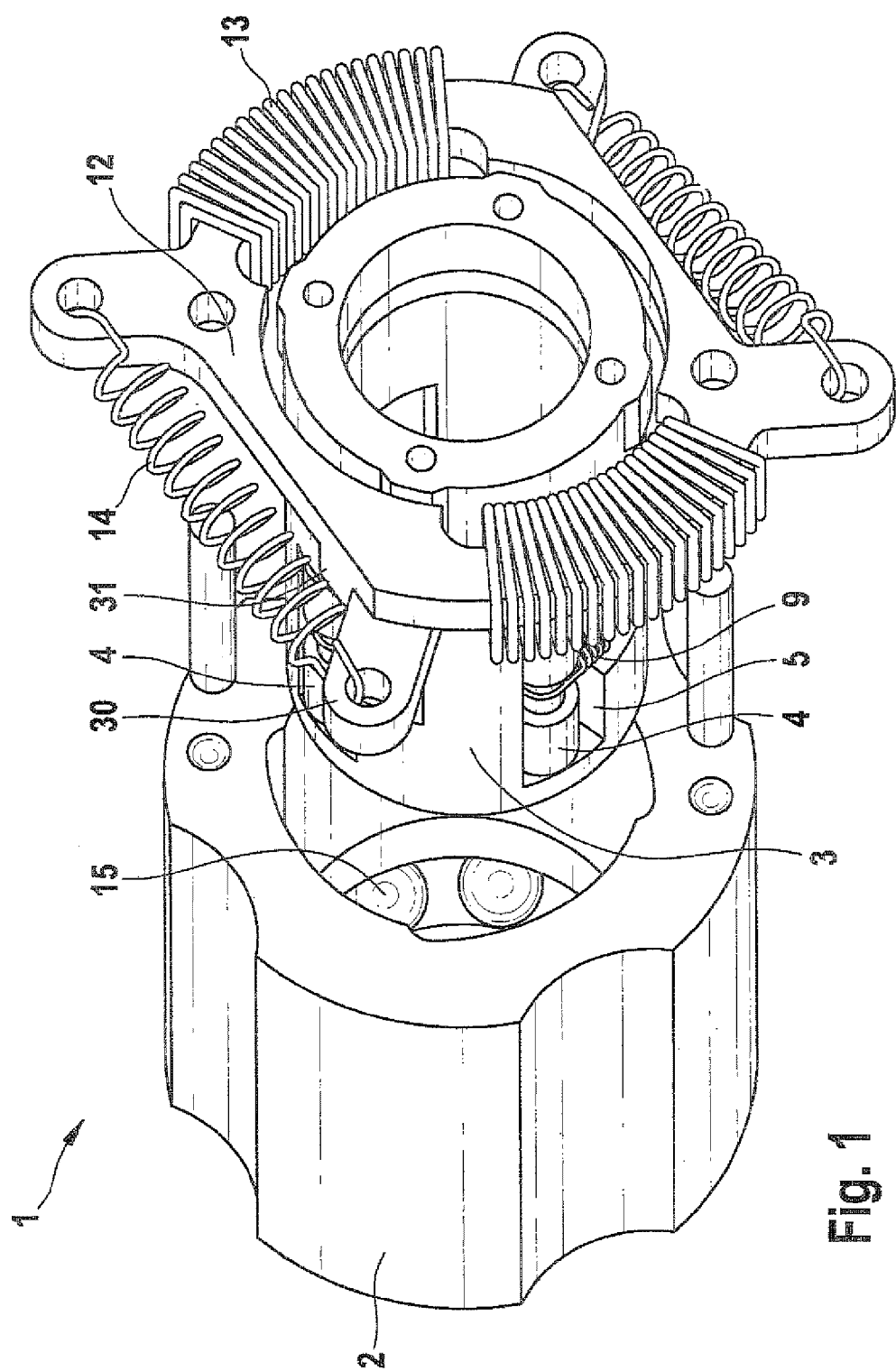
FIG. 1 shows a freewheeling mechanism of the invention, seen in perspective.

The freewheeling mechanism 1 shown in FIG. 1 has a tubular outer ring 2 and a locking element cage 3 disposed coaxially in the outer ring. For the sake of clarity in the drawing, a shaft that is disposed coaxially in the locking element cage 3 is not shown. The locking element cage 3 is tubular and has axially parallel, essentially rectangular openings, which are known as pockets 5 and in which cylindrical roller bodies are received that form locking elements 4 of the freewheeling mechanism 1.

Figure 2:
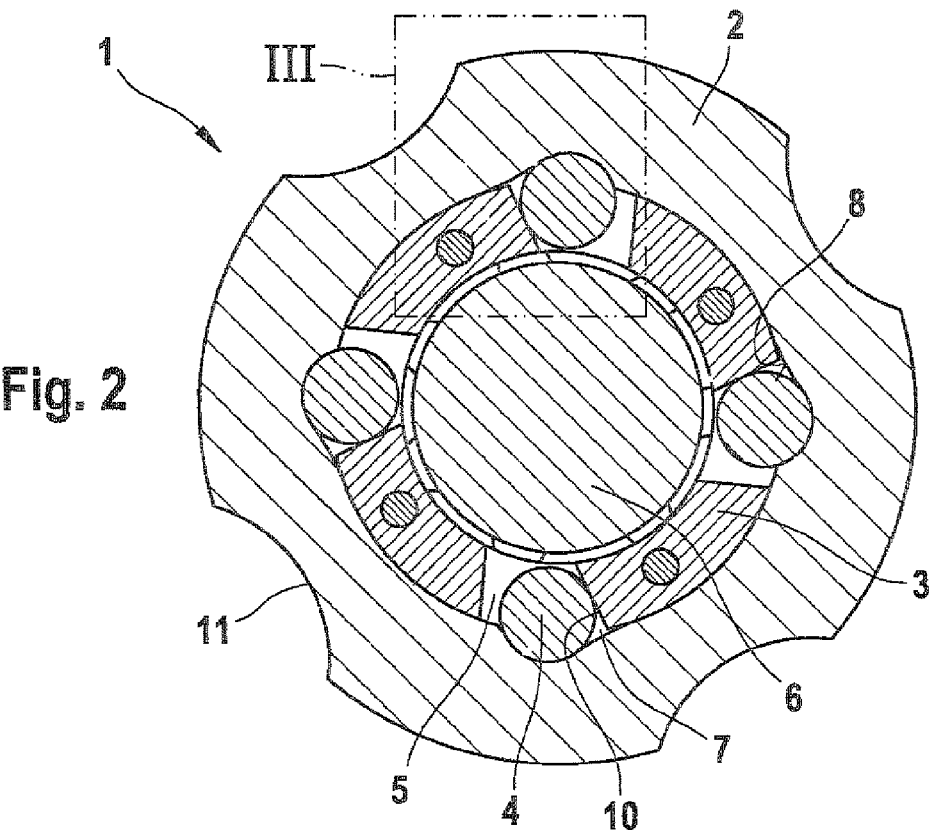
FIG. 2 is a cross section through the freewheeling mechanism of FIG. 1.

As can be seen in cross section in FIG. 2, the shaft 6, not shown in FIG. 1, of the freewheeling mechanism 1, the locking element cage 3, and the outer ring 2 are disposed concentrically to one another; the locking element cage 3 and the locking elements 4 are located in an annular interstice between the outer ring 2 and the shaft 6. On its inner circumference, the outer ring 2 has indentations, which are also known as pockets 7. The locking elements 4 roll on bottom faces 8 of the pockets 7. In the circumferential direction, the bottom faces 8 extend spirally at a wedge angle to the circumferential direction. A spacing of the bottom faces 8 of the pockets 7 of the outer ring 2 from the surface of the shaft 6 therefore decreases in a circumferential direction hereinafter called the locking direction.

For engaging the freewheeling mechanism 1, the locking element cage 3 is pivoted about its axis in the locking direction, which is counterclockwise in terms of the drawing; that is, it is rotated far enough that the locking elements 4 come into contact with the shaft 6. It moves the locking elements 4 in the circumferential direction; the locking elements 4 rolls on the bottom faces 8 of the pockets 7 of the outer ring 2 of the freewheeling mechanism 1. Since the bottom faces 8 spirally approach the shaft 6 in the locking direction, the locking elements 4 come into contact with the shaft 6 and are pressed against it. The locking element cage 3 and the locking elements 4 are moved into an engagement position, not shown, and the freewheeling mechanism 1 is engaged. A rotation of the shaft 6 in the locking direction urges the locking elements 4, pressed against it, in the locking direction, or in other words in the direction of the increasingly narrower wedge gap between the bottom faces 8 of the pockets 7 of the outer ring 2 and the shaft 6. The locking elements 4 lock the shaft 6 by nonpositive engagement against rotation in the locking direction. In the opposite rotary direction of the shaft 6, known as the freewheeling direction, the shaft 6 urges the locking elements 4, pressed against it, in the direction of the increasingly larger wedge gap between the bottom faces 8 of the pockets 7 of the outer ring 2 and the shaft 6. In this rotary direction, the shaft 6 is rotatable, with the freewheeling mechanism 1 engaged.

For disengaging the freewheeling mechanism 1, the locking element cage 3 is pivoting in the freewheeling direction about its axis into the disengagement position shown in FIG. 2. It moves the locking elements 4 in the circumferential direction, specifically in the freewheeling direction, up to the ends of the pockets 7. Here, the spacing of the bottom faces 8 of the pockets 7 of the outer ring 2 from the shaft 6 is greater than a diameter of the cylindrical locking elements 4 that are embodied as roller bodies; the locking elements 4 are out of action, and the shaft 6 is freely rotatable in both rotary directions.

The locking element cage 3 is supported rotatably or pivotably in the outer ring 2. The support is a slide bearing of the tubular locking element cage 3 in the outer ring 2. Other bearings are possible. The rotary bearing centers the locking element cage 3 in the outer ring 2, so that over the entire circumference, a uniform gap exists between the locking element cage 3 and the shaft 6, and the locking element cage 3 does not scrape the shaft 6. A transfer of torque from the shaft 6 to the locking element cage 3 and unintended engagement or disengagement of the freewheeling mechanism 1 are thereby avoided.

Spring elements 9, which are suspended from the locking element cage 3 and engage the locking elements 4, urge the locking elements 4 in the locking direction and into contact with one edge 10 of the pockets 5 of the locking element cage 3, this edge being located out of sight of the locking elements 4 in the locking direction. This edge 10 is oriented obliquely outward according to the invention, so that it urges the locking elements 4 outward against the bottom faces 8 of the pockets 7 of the outer ring 2. In the disengagement position shown in FIG. 2, the locking elements 4 have thus been lifted from the shat 6. The edges 10 of the pockets 5 of the locking element cage 3 may also be called contact faces for the locking elements 4. The locking elements 4 touch the shaft 6 only when the freewheeling mechanism 1 is engaged; when the freewheeling mechanism 1 is disengaged, there is a gap between the locking elements 4 and the shaft 6.

Figure 3:
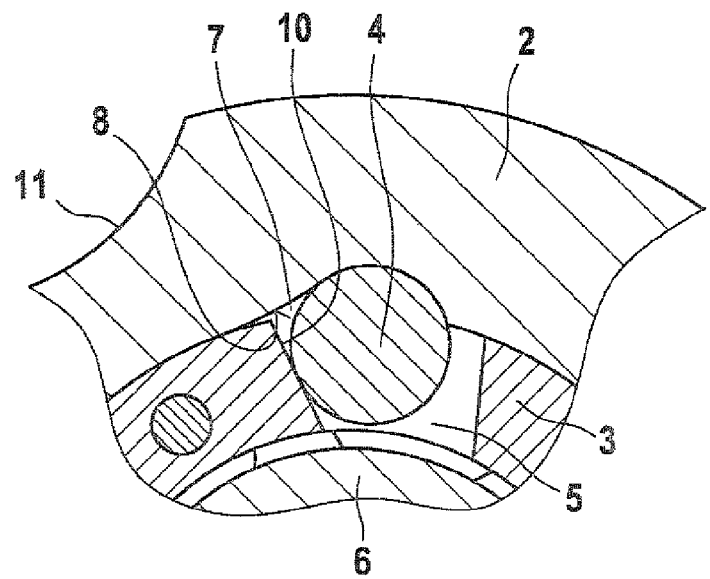
FIG. 3 illustrates a detail marked III in FIG. 2.

The enlargement shown in FIG. 3 in the region of one of the pockets 7 of the outer ring 2 shows that the bottom 8 of the pockets 7 is not at a constant wedge angle to the circumferential direction; instead, the wedge angle is greater on the end of the pockets 7 in the freewheeling direction, or in other words the right-hand end in FIG. 3, and becomes constant or gradually more-acute in the locking direction. The initially greater wedge angle of the bottom faces 8 of the pockets 7 brings about greater lifting of the locking elements 4 away from the shaft 6 upon disengagement of the freewheeling mechanism 1, at a predetermined pivot angle of the locking element cage 3. When the freewheeling mechanism 1 is disengaged, the gap between the locking elements 4 and the shaft 6 is greater. Moreover, the initially greater wedge angle enables engaging the freewheeling mechanism 1 with a smaller pivot angle of the locking element cage 3 and thus makes it possible to shorten the shifting time.

The acute wedge angle in an end region, in terms of the locking direction, of the bottom faces 8 of the pockets 7 of the outer ring 2 leads to a high clamping force and thus a good locking action. In the aforementioned end region of the bottom faces 8, the wedge angle is selected to be so acute that self-locking ensues. When the locking element cage 3 is pivoted far enough in the locking direction that the locking elements 4 are located at the acute wedge angle in the end regions, located in the locking direction, of the bottom faces 8 of the pockets 7, then they and the locking element cage 3, because of the self-locking, remain on their own in the locking position; that is, the freewheeling mechanism 1 in this case does not release from its engaged position. For release, either the locking element cage 3 or the shaft 6 must be pivoted in the freewheeling direction. To improve the self-locking action, an outside of the outer ring 2 is provided with recesses 11 on the end regions, located in the locking direction, of the bottom faces 8 of the pockets 7. In those regions, a wall thickness of the outer ring 2 is weakened; in those regions, the outer ring 2 is elastic and resilient in the radial direction. As a result of the elasticity of the outer ring 2 in the aforementioned end regions of the bottom faces 8 of the pockets 7, the locking elements 4 are pressed resiliently against the shaft 6. Unintentional release, for instance from the pivoting motion of the shaft 6 with a small pivot angle relative to the outer ring 2, or from vibration, is counteracted; the hold of the freewheeling mechanism 1 in the self-locking, locking engagement position is improved. The desired elasticity of the outer ring 2 in the radial direction in the region of the pockets 7 can also be attained in some other way. For instance, a housing, not shown in FIGS. 1 through 3, and to which the outer ring 2 is pressed can have recesses on the inside in the aforementioned regions. In that case, bracing of the outer ring 2 from outside in those regions is omitted, and free spaces are created into which the outer ring 2 can yield radially outward.

In a middle region between the end regions having the large wedge angle and with the acute wedge angle that brings about the self-locking of the locking elements 4 and of the freewheeling mechanism 1, the bottom face 8 of the pockets 7 of the outer ring 2 has a wedge angle that is so acute that self-locking ensues; that is, with the freewheeling mechanism 1 engaged, reliable locking against rotation of the shaft 6 in the locking direction is ensured under all operating conditions. However, in the aforementioned middle region of the bottom face 8 of the pockets 7, the wedge angle is larger, or in other words more-obtuse, than in the end region, so that the freewheeling mechanism 1 does not seize in the engaged position if the shaft 6 is rotated in the locking direction.

The locking element cage 3 protrudes from the outer ring 2 on one side; in this region, it is located in a stator 12 (FIG. 1) that is rigidly connected to the outer ring 2. The stator 12 has two coils 13 located diametrically opposite one another or in other words rotationally symmetrically. The locking element cage 3 forms a rotor. The outer ring 2 with its stator 12 and the locking element cage 3 are thus embodied as a rotor and a stator on the order of an electric motor. Providing current to the coils 13 generates a rotationally symmetrical magnetic field, which exerts a torque in the locking direction on the locking element cage 3. The freewheeling mechanism 1 can thus be engaged by the provision of current to the coils 13. The torque engaging the locking element cage 3 is rotationally symmetrical; the locking element cage 3 is not urged transversely to the shaft 6.

For restoration, or in other words for disengaging the freewheeling mechanism 1, two tangentially disposed spring elements 14 are provided, which engage the stator 12 and the locking element cage 3 that forms the rotor. The restoring spring elements 14 are disposed symmetrically and likewise urge the locking element cage 3 solely rotationally symmetrically, or in other words without a resultant transverse force. In the exemplary embodiment shown of the invention the restoring spring elements 14 are embodied as helical tension springs.

The freewheeling mechanism 1 has an overall rotationally symmetrical construction, without eccentricities. Transverse forces from accelerations and jarring of the freewheeling mechanism 1 therefore do not exert any torque on parts of the freewheeling mechanism 1 that urge it in the engagement position or the disengagement position. Unintentional shifting of the freewheeling mechanism 1 is thus avoided.

In the exemplary embodiment shown, the locking element cage 3 is in one piece with the rotor; it itself forms the rotor. According to the invention, it is also possible to connect the rotor rigidly to the locking element cage 3, for instance with a pin, rivet, and/or screw connection (not shown). As a result, the locking element cage 3 can be produced from a magnetically nonconductive material, to avoid magnetic effects on the locking elements 4 when current is supplied to the coils 13.

On the side away from the stator 12, the outer ring 2 protrudes past the locking element cage 3. There, it has a shaft bearing 15 for the shaft 6, not shown in FIG. 1, of the freewheeling mechanism 1. In the exemplary embodiment shown of the invention, a ball bearing has been selected as the shaft bearing 15. Still other roller bearings or a slide bearing can also be used as the shaft bearing 15 (these options are not shown). As a result, the shaft 6 is rotatably supported and radially braced axially quite close to the freewheeling mechanism 1, or in other words to the locking elements 4. As a result, good coaxially of the shaft 6 in the outer ring 2 is attained, which is important for the function of the freewheeling mechanism 1. Preferably, the shaft 6 not shown in FIG. 1 is rotatably supported and radially braced on both sides of the locking elements 4 and close to the locking elements 6, to ensure good coaxially of the shaft 6 in the outer ring 2 even if a load is put on the shaft 6. As a result, a locking action distributed uniformly over all the locking elements 4 is attained, which is important for proper function of the freewheeling mechanism 1.

The locking element cage 3 has a pivot angle limitation. In the exemplary embodiment, this is formed by tabs 30 protruding radially outward from the locking element cage 3, from which tabs the spring elements 14 for restoring the locking element cage 3 and for disengaging the freewheeling mechanism 1 are suspended. The tabs 30 cooperate with stops 31 on the stator 12, which limit the pivot angle of the locking element cage 3 in both directions.

Figure 4:
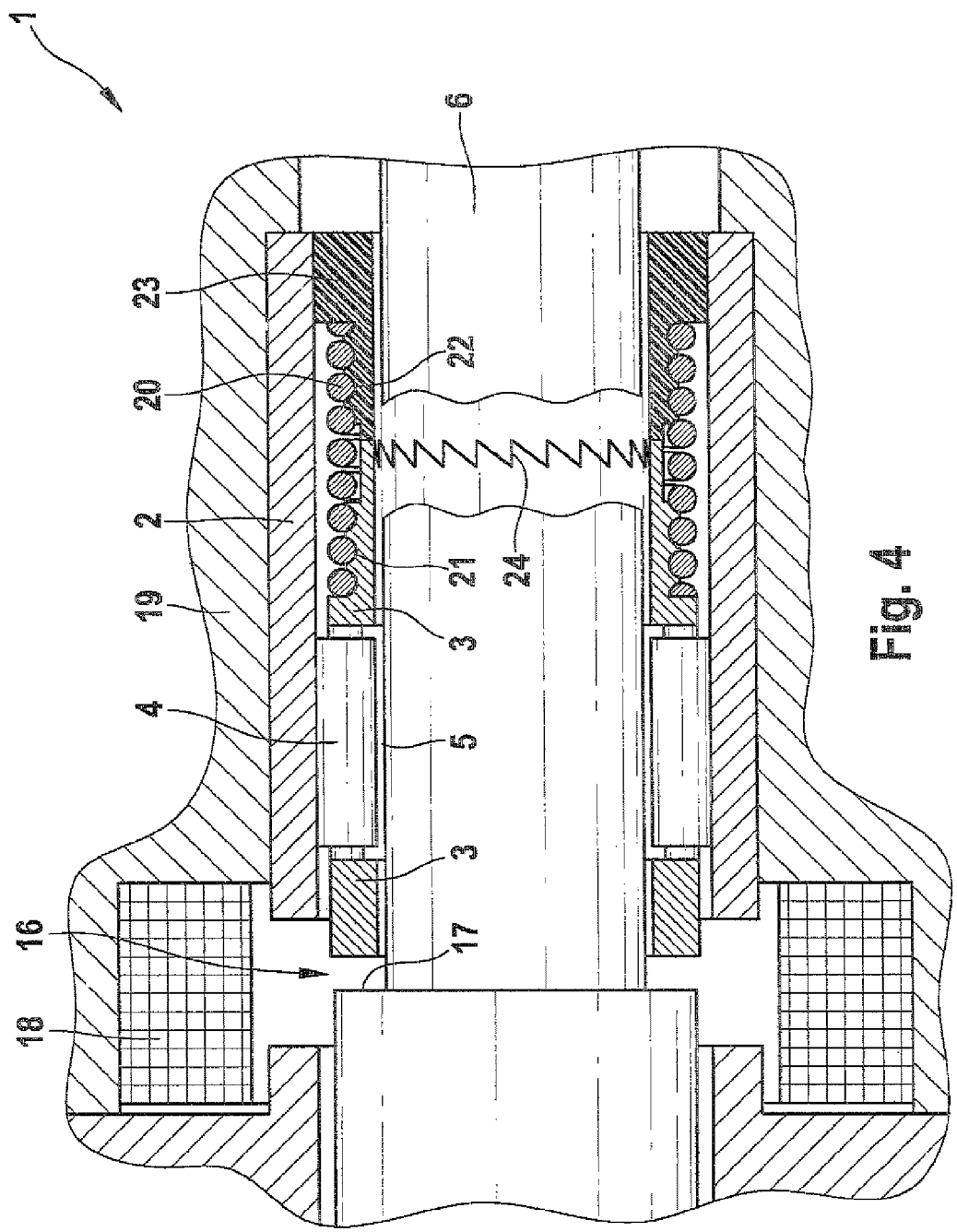
FIG. 4 is an axial section through a modified embodiment of a freewheeling mechanism of the invention.

In the embodiment of the invention shown in FIG. 4, the freewheeling mechanism 1 has a shiftable friction clutch 16. The friction clutch 16 is formed by the locking element cage 3 and an annular shoulder 17 on a diameter graduation of the shaft 6, against which the locking element cage 3 is pressed in the axial direction and by its face end upon engagement of the friction clutch 16. When the friction clutch 16 is engaged, the shaft 6, when it rotates, subjects the locking element cage 3 to a torque. Depending on the rotary direction of the shaft 6, the freewheeling mechanism 1 can be engaged and disengaged as a result.

Engaging of the shiftable friction clutch 16 is done magnetically by the provision of current to a coil 18, which is inserted into a housing 19 into which the outer ring 2 of the freewheeling mechanism 1 is pressed. The housing 19 may be a component of a housing of an electromechanical friction brake, not shown in FIG. 4. Providing current to the coil 18 creates a magnetic field, which pulls the locking element cage 3 axially against the annular shoulder 17 of the shaft 6 and thus engages the friction clutch 16. A magnetic circuit is closed by the housing 19, the outer ring 2, the locking element cage 3, and the shaft 6. The locking element cage 3 may also be conceived of as an armature, and the annular shoulder 17 of the shaft 6 as a pole piece, of an electromagnet that also includes the coil 18, for engaging and shifting the friction clutch 16. The shiftable friction clutch 16 has the advantage that the freewheeling mechanism 1 can be shifted continuously variably into any angular position.

For disengagement, the friction clutch 16 has a spring element 20, which in the exemplary embodiment shown of the invention is embodied as a helical tension spring. The spring element 20 is screwed by one end onto a helical groove 21 of the locking element cage 3 and by the other end onto a helical groove 22 of a restoring element 23. The restoring element 23 is tubular and is disposed coaxially to the outer ring 2 and to the shaft 6. The restoring element 23 is pressed into the outer ring 2 and thus held axially and in a manner fixed against relative rotation. After the supply of current to the coil 18 is switched off the spring element 20, by its spring force, pulls the locking element cage 3 axially away from the annular shoulder 17 of the shaft 6 and disengages the friction clutch 16. Since upon engagement of the friction clutch 16 and engagement of the freewheeling mechanism 1, the locking element cage 3 is pivoted by rotation of the shaft 6 in the rotary direction of the shaft 6, the spring element 20 is rotated elastically. When the coil 18 is switched off, the previously elastically rotated spring element 20 exerts a restoring torque on the locking element cage 3 in the freewheeling direction, which reinforces the disengagement of the freewheeling mechanism 1. Moreover, face ends, facing one another, of the locking element cage 3 and of the restoring element 23 have complementary sawtooth-like teeth 24, whose direction is selected such that they likewise exert a restoring torque in the freewheeling direction and thus in the disengagement direction of the freewheeling mechanism 1, when the locking element cage 3 is pulled by the spring element 20 against the restoring element 23.

Otherwise, the freewheeling mechanism 1 shown in FIG. 4 is embodied identically to the freewheeling mechanism 1 shown in FIGS. 1 through 3 and described above, and functions in the same way. To avoid repetition, reference is therefore made to the aforementioned explanations of FIGS. 1 through 3. For the same components, the same reference numerals are used.

Figure 5:
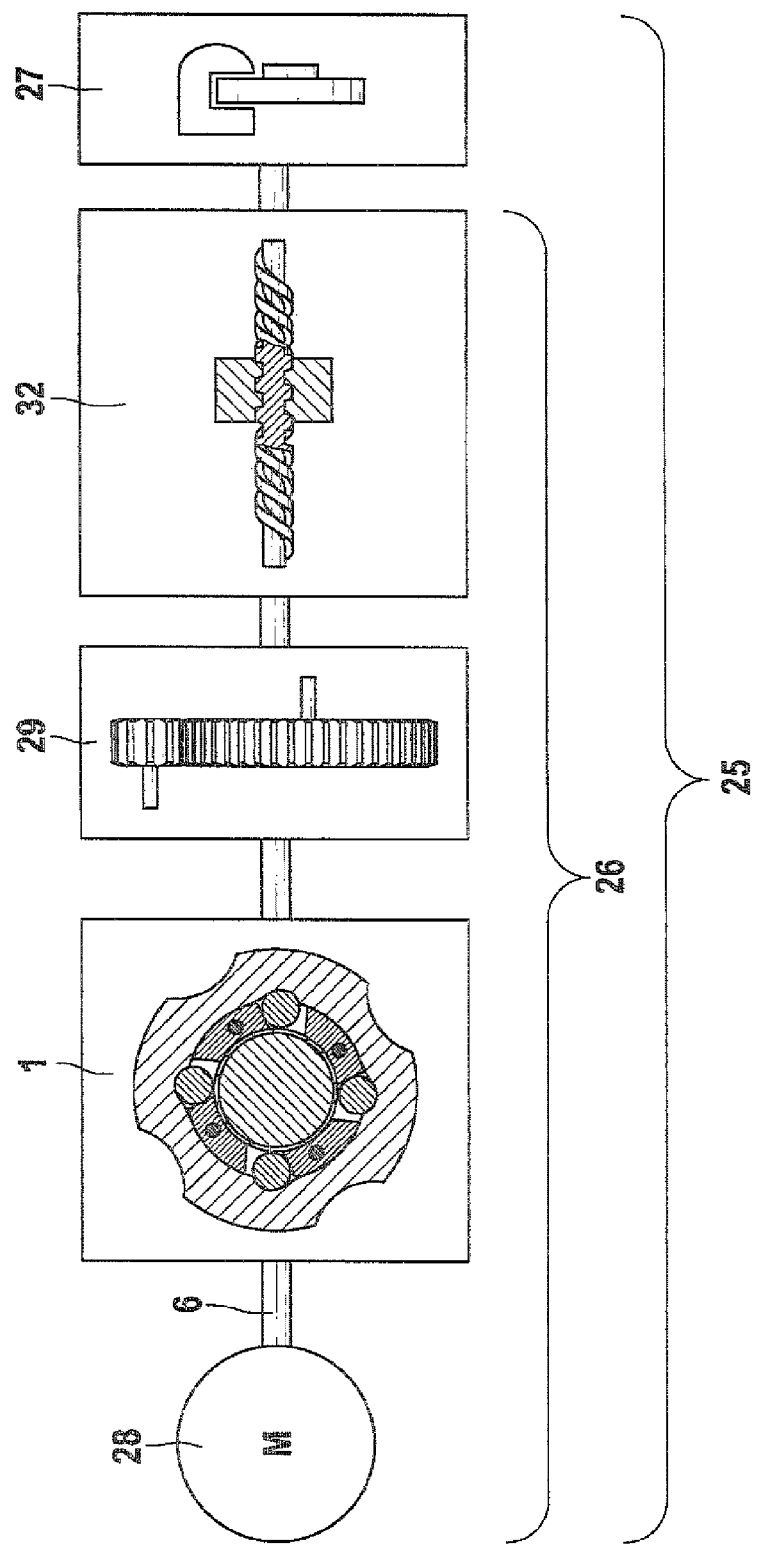
FIG. 5 shows a schematic illustration of an electromechanical vehicle brake of the invention.

The electromechanical vehicle brake 25 according to the invention, shown in FIG. 5 in the form of a mechanical circuit diagram, is intended as a wheel brake for a motor vehicle. It has an electromechanical actuation device 26, with which a friction brake lining, not shown individually, can be pressed for braking against a friction clutch, such as a brake disk 27. Such vehicle brakes are known per se in various constructions and will therefore not be described in further detail here. The actuation device 26 has an electric motor 28, with which a rotation-to-translation conversion gear 32, for instance in the form of a worm drive, can be driven via a step-down gear 29. The rotation-to-translation conversion gear 32 converts a rotary driving motion of the electric motor 28 into a translational motion for pressing the friction brake lining against the brake disk 27. To the extent described thus far, the electromechanical vehicle brake 25 is a service brake.

The selective freewheeling mechanism 1 described above is disposed on a motor shaft of the electric motor 2. In other words, the motor shaft is the freewheeling mechanism's shaft 6, or the two shafts are joined together in a manner fixed against relative rotation. The freewheeling mechanism 1 may also act at some other point on the actuation device 26 of the vehicle brake 25; for instance, it may (not shown) be disposed on a gear shaft of the step-down gear 29. The freewheeling direction of the freewheeling mechanism 1 is selected to be in the actuation direction of the vehicle brake 25, and the locking direction of the freewheeling mechanism 1 is selected to be in the release direction of the vehicle brake 25. In the disengagement position of the freewheeling mechanism 1, the vehicle brake 25 forms an actuatable and releasable service brake. Once the freewheeling mechanism 1 is engaged, the vehicle brake 25 can only be actuated, or in other words tightened, but cannot be released. A braking force once exerted is preserved. In that case, the vehicle brake 25 forms a parking brake. Since the actuated vehicle brake 25, by mechanical tension, urges the motor shaft of the electric motor 28 in the release direction of the vehicle brake 25 and thus in the locking direction of the freewheeling mechanism 1, the freewheeling mechanism 1 remains engaged and locked, as described further above, even when it is not supplied with current. The parking brake force, once built up, is thus maintained even when the vehicle brake 25 is without energy. Furthermore, for locking the actuated vehicle brake 25, the locking element cage 3 can be pivoted so markedly in the locking direction that the aforementioned self-locking ensues, which keeps the freewheeling mechanism 1 in the engaged locking position. For release, the mechanical tension of the motor shaft must be reversed by supplying current to the electric motor 28 in the actuation direction, thereby disengaging the freewheeling mechanism 1.

The foregoing relates to the preferred exemplary embodiment of the invention, it being understood that other variants and embodiments thereof are possible within the spirit and scope of the invention, the latter being defined by the appended claims.

The invention claimed is:

1. A selective freewheeling mechanism for expanding an electromechanical vehicle brake into a parking brake, comprising:
   an outer ring;
   a locking element cage disposed in the outer ring;
   a shaft disposed in the locking element cage; and
   a plurality of locking elements disposed between the shaft and the outer ring;

wherein the outer ring, the locking element cage, the shaft and the locking elements are arranged such that the freewheeling mechanism is disengaged when the locking element cage is pivoted relative to the outer ring about a rotation axis into a disengagement position which moves the locking elements into a disengagement position away from the shaft such that the outer ring and the shaft are rotatable relative to one another, wherein the freewheeling mechanism is engaged when the locking element cage is pivoted relative to the outer ring about said rotation axis into an engagement position which moves the locking elements into an engagement position with the shaft in which the locking elements lock the shaft and the outer ring against a rotation relative to one another in a locking direction, but which allow the outer ring and the shaft to rotate relative to one another in an opposite freewheeling direction, and wherein the locking element cage and the outer ring are embodied as a rotor and stator of an electric motor having at least one coil arranged such that, when current is applied to the coil, the locking element cage and the outer ring are pivoted relative to one another about said rotation axis into the engagement or disengagement position.

2. The selective freewheeling mechanism according to claim 1, wherein the outer ring of the freewheeling mechanism has a shaft bearing for the shaft of the freewheeling mechanism.

3. The selective freewheeling mechanism according to claim 1, wherein the freewheeling mechanism has restoring spring elements that engage the stator and the locking element cage, the restoring spring elements being disposed symmetrically about said rotation axis for urging the locking element cage to the disengagement position.

4. The selective freewheeling mechanism according to claim 1, wherein the locking element cage has a centering means.

5. The selective freewheeling mechanism according to claim 1, wherein the locking element cage has contact faces for the locking elements, the contact faces being oriented obliquely to the outer ring and in the disengagement position urging the locking elements toward the outer ring.

6. The selective freewheeling mechanism according to claim 1, wherein the freewheeling mechanism has a pivot angle limitation, which limits a pivot angle of the locking element cage relative to the outer ring.

7. The selective freewheeling mechanism according to claim 6, wherein the pivot angle limitation is formed by tabs protruding radially outward from the locking element cage that cooperate with stops on the stator.

8. The selective freewheeling mechanism according to claim 1, wherein the freewheeling mechanism acts by non-positive engagement and has roller bodies as locking elements, which are disposed in wedge gaps that taper in a circumferential direction between the outer ring and the shaft; and that a wedge angle of the wedge gaps becomes more-acute in the locking direction.

9. The selective freewheeling mechanism according to claim 8, wherein the wedge angle of the wedge gaps becomes so acute that the freewheeling mechanism remains in the locking engagement position in self-locking fashion.

10. The selective freewheeling mechanism according to claim 9, wherein the outer ring is radially elastic in self-locking regions of the wedge gaps.

11. The selective freewheeling mechanism according to claim 10, wherein the radial elasticity is provided by a wall thickness of the outer ring being weakened in the self-locking regions by recesses formed on an outside surface of the outer ring.

12. The selective freewheeling mechanism according to claim 1, wherein the freewheeling mechanism has a shiftable friction clutch, by means of which the locking element cage is connected by frictional engagement to the shaft.

13. The selective freewheeling mechanism according to claim 12, wherein the friction clutch has a restoring spring which, upon disengagement of the friction clutch, exerts a torque in the direction of the disengagement position on the locking element cage.

14. The selective freewheeling mechanism according to claim 13, wherein the restoring spring has one end attached to the locking element cage and another end attached to a restoring element, and end faces, facing one another, of the locking element cage and the restoring element have complementary sawtooth-like teeth that exert a restoring torque in the direction of disengagement.

15. The selective freewheeling mechanism according to claim 12, wherein the friction clutch is formed by the locking element cage and an annular shoulder on a diameter graduation of the shaft against which the locking element cage is pressed in an axial direction upon engagement of the friction clutch.

16. The selective freewheeling mechanism according to claim 1, wherein the outer ring has pockets on its inner circumference with bottom faces that extend at a wedge angle that decreases in the locking direction.

17. The selective freewheeling mechanism according to claim 16, wherein the locking elements roll on the bottom faces of the pockets and rotation of the shaft in the locking direction urges the locking elements in a direction of an increasingly narrower wedge gap between the bottom faces of the pockets and the shaft.

18. The selective freewheeling mechanism according to claim 1, wherein the locking elements touch the shaft only when the freewheeling mechanism is engaged, and when the freewheeling mechanism is disengaged, there is a gap between the locking elements and the shaft.

19. An electromechanical vehicle brake having a selective freewheeling mechanism comprising:
  an outer ring;
  a locking element cage disposed in the outer ring;
  a shaft disposed in the locking element cage; and
  a plurality of locking elements disposed between the shaft and the outer ring;
  wherein the outer ring, the locking element cage, the shaft and the locking elements are arranged such that the freewheeling mechanism is disengaged when the locking element cage is pivoted relative to the outer ring about a rotation axis into a disengagement position which moves the locking elements into a disengagement position away from the shaft such that the outer ring and the shaft are rotatable relative to one another,
  wherein the freewheeling mechanism is engaged when the locking element cage is pivoted relative to the outer ring about said rotation axis into an engagement position which moves the locking elements into an engagement position with the shaft in which the locking elements lock the shaft and the outer ring against a rotation relative to one another in a locking direction, but which allow the outer ring and the shaft to rotate relative to one another in an opposite freewheeling direction,
  wherein the locking element cage and the outer ring are embodied as a rotor and stator of an electric motor having at least one coil arranged such that, when current is applied to the coil, the locking element cage and the outer ring are pivoted relative to one another about said rotation axis into the engagement or disengagement position, and wherein the engaged freewheeling mechanism locks the vehicle brake against being released.

20. A selective freewheeling mechanism, comprising:

an outer ring;

a locking element cage disposed in the outer ring;

a shaft disposed in the locking element cage; and a plurality of locking elements disposed between the shaft and the outer ring;

wherein the outer ring, the locking element cage, the shaft and the locking elements are arranged such that the freewheeling mechanism is disengaged when the locking element cage is pivoted relative to the outer ring about a rotation axis into a disengagement position which moves the locking elements into a disengagement position away from the shaft such that the outer ring and the shaft are rotatable relative to one another, wherein the freewheeling mechanism is engaged when the locking element cage is pivoted relative to the outer ring about said rotation axis into an engagement position which moves the locking elements into an engagement position with the shaft in which the locking elements lock the shaft and the outer ring against a rotation relative to one another in a locking direction, but which allow the outer ring and the shaft to rotate relative to one another in an opposite rotary direction, the freewheeling direction, wherein the locking element cage and the outer ring are embodied as a rotor and stator of an electric motor having at least one coil arranged such that, when current is applied to the coil, the locking element cage and the outer ring are pivoted relative to one another about said rotation axis into the engagement or disengagement position, wherein the freewheeling mechanism acts by nonpositive engagement and has roller bodies as locking elements which are disposed in wedge gaps that taper in a circumferential direction between the outer ring and the shaft, and the wedge gaps have a wedge angle that becomes more-acute in the locking direction, wherein the wedge angle of the wedge gaps becomes so acute that the freewheeling mechanism remains in the locking engagement position in self-locking fashion, and wherein the outer ring is radially elastic in self-locking regions of the wedge gaps.

* * * * *